US006820875B1

(12) United States Patent
Hedrick et al.

(10) Patent No.: US 6,820,875 B1
(45) Date of Patent: Nov. 23, 2004

(54) MODULAR CABINETS AND REPLACEABLE LAMINATE PANELS FOR A GAMING DEVICE

(75) Inventors: Joseph R. Hedrick, Reno, NV (US); Jean P. LeGras, Reno, NV (US); Kehl T. LeSourd, Reno, NV (US); Kirk A. Tedsen, Reno, NV (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 09/690,705

(22) Filed: Oct. 17, 2000

(51) Int. Cl.[7] .................................................. A63F 13/00

(52) U.S. Cl. ....................... 273/138.1; 273/143; 463/46; 312/265.6

(58) Field of Search .............................. 273/143, 138.1, 273/147; 312/265.5, 265.6, 257.1, 204, 107, 108, 111, 7.2, 114, 198; 348/836, 841; 463/1, 46

(56) References Cited

U.S. PATENT DOCUMENTS 1,079,507 A * 11/1913 McClernan ............. 312/107 X
2,598,072 A * 5/1952 Rose ....................... 348/841 X (List continued on next page.)

FOREIGN PATENT DOCUMENTS

FR 1216077 * 4/1960 .............. 312/265.5

OTHER PUBLICATIONS

Slot Machines published by Reno–Tahoe Specialty, Inc. in 1989.

Elvis Brochure pubished by IGT in 1999.

Totem Pole Brochure published by IGT in 1997.

Slotopoly Brochure published by IGT in 1998.

Wheel of Fortune Video published by IGT in 1999.

Wheel of Fortune Brochure published by IGT in 1998.

Mega Jackpots Brochure published by IGT in 1998.

Top Dollar Brochure published by IGT in 1998.

Keno Machine Picture published by IGT. (No Date Given).

Morph Game Pictures published by IGT on Sep. 12, 1999.

*Primary Examiner*—James O. Hansen
(74) *Attorney, Agent, or Firm*—Bell, Boyd & Lloyd LLC

(57) ABSTRACT

The present invention relates to a modular cabinet for use with a gaming device. The gaming device modular cabinet includes a display cabinet removably connected to a component cabinet by a locking mechanism. The cabinets are preferably made of rolled steel, where the display cabinet is adapted to receive at least the display, while the component cabinet is adapted to receive the components for the gaming device other than the display. In a preferred embodiment, the present invention includes laminated side panels connected to the display and component cabinets. The gaming device further includes a monitor cover removably connected to the display cabinet.

32 Claims, 8 Drawing Sheets

U.S. PATENT DOCUMENTS

| | | | | | |
|---|---|---|---|---|---|
| 2,912,294 | A | * | 11/1959 | Wells et al. | 312/111 |
| 3,563,624 | A | * | 2/1971 | Stice | 312/107 X |
| D275,208 | S | | 8/1984 | Nutting | |
| D275,209 | S | | 8/1984 | Nutting | |
| D284,592 | S | | 7/1986 | Drews et al. | |
| 4,648,600 | A | | 3/1987 | Olliges | |
| 4,695,053 | A | | 9/1987 | Vazquez, Jr. et al. | |
| 4,813,675 | A | | 3/1989 | Greenwood | |
| 4,874,210 | A | * | 10/1989 | Carroll | 312/257.1 |
| D307,771 | S | | 5/1990 | Cesaroni et al. | |
| 4,991,848 | A | | 2/1991 | Greenwood et al. | |
| 5,175,627 | A | * | 12/1992 | Josephs | 348/841 |
| 5,176,435 | A | * | 1/1993 | Pipkens | 312/204 |
| 5,244,267 | A | * | 9/1993 | Fossier, Jr. et al. | 312/231 |
| 5,335,605 | A | * | 8/1994 | Drabczyk | 312/204 X |
| 5,611,535 | A | | 3/1997 | Tiberio | |
| 5,813,914 | A | * | 9/1998 | McKay et al. | 463/46 |
| 5,826,882 | A | * | 10/1998 | Ward | 312/265.6 X |
| D400,597 | S | | 11/1998 | Hedrick et al. | |
| D403,363 | S | | 12/1998 | McGahn et al. | |
| D404,084 | S | | 1/1999 | Hedrick et al. | |
| D404,436 | S | | 1/1999 | McGahn et al. | |
| D406,615 | S | | 3/1999 | Griswold et al. | |
| D412,347 | S | | 7/1999 | DeSimone et al. | |
| 5,951,131 | A | * | 9/1999 | Stefan | 312/265.5 X |
| D416,054 | S | | 11/1999 | McGahn et al. | |
| 5,984,781 | A | | 11/1999 | Sunaga | |
| 6,012,982 | A | | 1/2000 | Piechowiak et al. | |
| D421,277 | S | | 2/2000 | McGahn et al. | |
| 6,053,585 | A | * | 4/2000 | Osen | 312/204 |
| 6,056,642 | A | | 5/2000 | Bennett | |
| 6,086,174 | A | * | 7/2000 | Graves et al. | 312/265.5 X |
| 6,102,798 | A | | 8/2000 | Bennett | |
| 6,113,098 | A | | 9/2000 | Adams | |
| 6,161,805 | A | | 12/2000 | Wells | |
| 6,164,645 | A | | 12/2000 | Weiss | |
| 6,168,522 | B1 | | 1/2001 | Walker et al. | |
| 6,267,462 | B1 | * | 7/2001 | Krause et al. | 312/111 |

* cited by examiner

MODULAR CABINETS AND REPLACEABLE LAMINATE PANELS FOR A GAMING DEVICE

CROSS-REFERENCE TO RELATED APPLICATIONS

This application is related to the following commonly-owned co-pending patent applications: "PLAYER INTERFACE AND TRAY FOR A GAMING DEVICE," Ser. No. 29/130,983, "PROTECTED COIN TRAY FOR USE WITH A GAMING DEVICE," Ser. No. 09/685,186, "TRANSLUCENT MONITOR MASKS, SUBSTRATE AND APPARATUS FOR REMOVABLE ATTACHMENT TO GAMING DEVICE CABINET," Ser. No. 09/686,243, "DISPLAY AND MASK FOR A GAMING DEVICE," Ser. No. 29/130,997, "DISPLAY AND MASK FOR A GAMING DEVICE," Ser. No. 29/131,001, "DISPLAY AND MASK FOR A GAMING DEVICE," Ser. No. 29/131,076, "TRAY FOR A GAMING DEVICE," Ser. No. 29/130,981, "PLAYER INTERFACE WITH BOLSTER FOR A GAMING DEVICE," Ser. No. 29/130,980, "PLATE FOR A MIDSECTION OF A GAMING DEVICE," Ser. No. 29/130,992, "TOP UNIT AND BASE FOR A GAMING DEVICE," Ser. No. 29/130,979, "BASE FOR TOP UNIT OF A GAMING DEVICE," Ser. No. 29/130,982, and "GAMING DEVICE," Ser. No. 29/130,996,

DESCRIPTION

The present invention relates in general to a gaming device, and more particularly to a gaming device having a modular construction with replaceable laminate panels and a method for manufacturing, modifying, changing and repairing such gaming devices.

BACKGROUND OF THE INVENTION

Manufacturing gaming devices is an expensive and time intensive process. Currently, gaming devices are effectively custom designed to accommodate a particular gaming theme or scheme. While many similar parts are used for gaming devices such as player input devices or buttons and coin, token and bill acceptors, the overall design or appearance of contemporary gaming device are somewhat dependant on the gaming theme or scheme. Obviously, such gaming devices cannot be built until the manufacturer determines the game theme and scheme. This includes determining the decorations such as the color of and other indicia on the outside of the gaming device viewable by the players.

One conventional process for assembling a gaming device includes attaching wood panels to a steel cabinet or laminating directly to the steel cabinet structure. The exterior surfaces of the wood panels are laminated or otherwise decorated. The wood panels are cut or otherwise made to fit the cabinet, which is a time intensive and expensive process. These wood panels are difficult to work with, heavy, unwieldy and require a great deal of maneuvering to properly position the panels on the cabinet during the manufacturing process. Moreover, removing and replacing these panels is difficult. The wood panels cannot easily be removed in a gaming area to change the gaming theme or scheme of a gaming device or exchange new panels for damaged or discolored panels. The attachment of laminate directly to the steel cabinet structure requires the lamination process to take place prior to any assembly. This process increases lead times because no work can be done until the laminate has been applied.

Removing such gaming devices from the gaming area to change the panels is prohibitively expensive for the gaming owners and disruptive to their patrons. Gaming device owners prefer to conduct such changes or make the repairs on the gaming floor, limiting the gaming device down time while at the same time not disrupting the patrons of adjacent devices.

SUMMARY OF THE INVENTION

The present invention provides a gaming device having a modular cabinet construction and replaceable laminate panels which significantly enhances the manufacturing, modification and repair processes for gaming devices. In the preferred embodiment, the modular cabinet includes upper and lower cabinets or housings removably connected together and two replaceable laminate panels removably connected to the opposite sides of the modular cabinets. The present invention also contemplates a third laminate panel connected to the back of the gaming device if desired by the manufacturer.

The first or display housing or cabinet is adapted to receive a gaming device display and a removable monitor mask apparatus is connected thereto. A plurality of differently sized display housings and mask apparatuses are contemplated for use with a plurality of differently sized displays. It is also contemplated that the display housing could be sized to receive differently sized monitors. The second or component housing is adapted to receive all of the other gaming device electronic components and player interface and input devices. The component housing can be of any suitable size or shape.

The replaceable laminate panels include a substrate and a laminate on the outer or exterior side of the substrate. Preferably, the substrate is extruded from aluminum or an aluminum alloy, although other suitable materials or methods of manufacture are contemplated. The laminate layer, preferably displaying the decorations, colors, figures, characters and indicia representing the gaming theme and scheme of the gaming device is applied to the exterior side of the substrate. The laminate layer is preferably a colored, pressure sensitive laminate comprised of vinyl, vinyl and metal composite, polyvinyl chloride, or some other mixture, applied to the outer surface of the substrates. The laminate panels are relatively simple and inexpensive to fabricate, light in weight, thin, yet strong and resistant to abuse. Suitable fastening devices are used to removably attach the laminate panels to the cabinets.

It is therefore an object of the present invention to provide a gaming device having a modular construction and replaceable laminate panels that are configured to look as if they were installed in a conventional manner.

A further object of the present invention is to provide modular cabinets for use with a gaming device.

A further object of the present invention to provide a gaming device with replaceable laminate panels.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Figure 1:
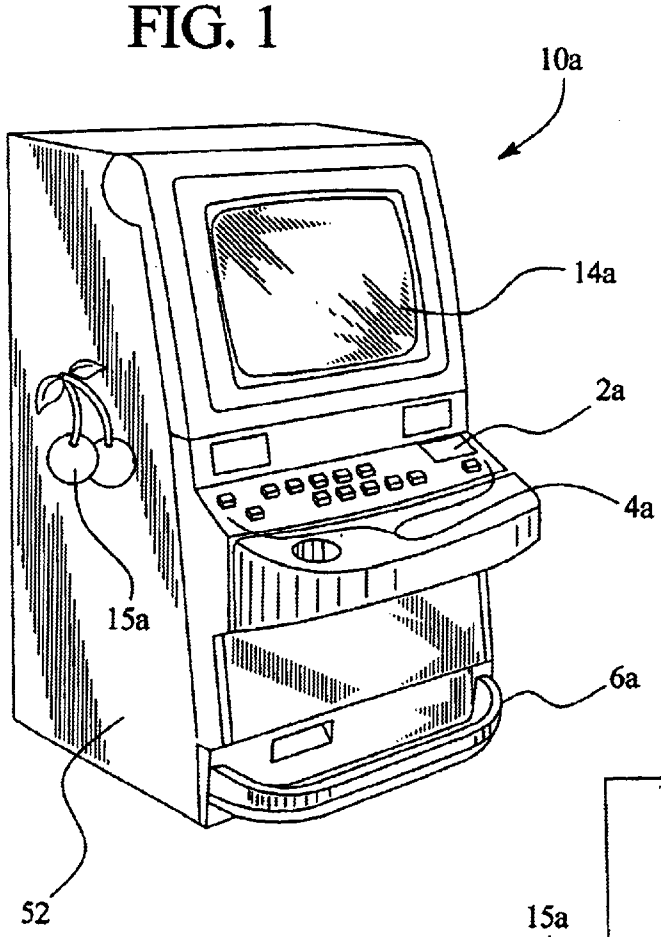
FIG. 1 is a front perspective view of one embodiment of the gaming device of the present invention having a modular construction and laminate side panels.
Figure 2:
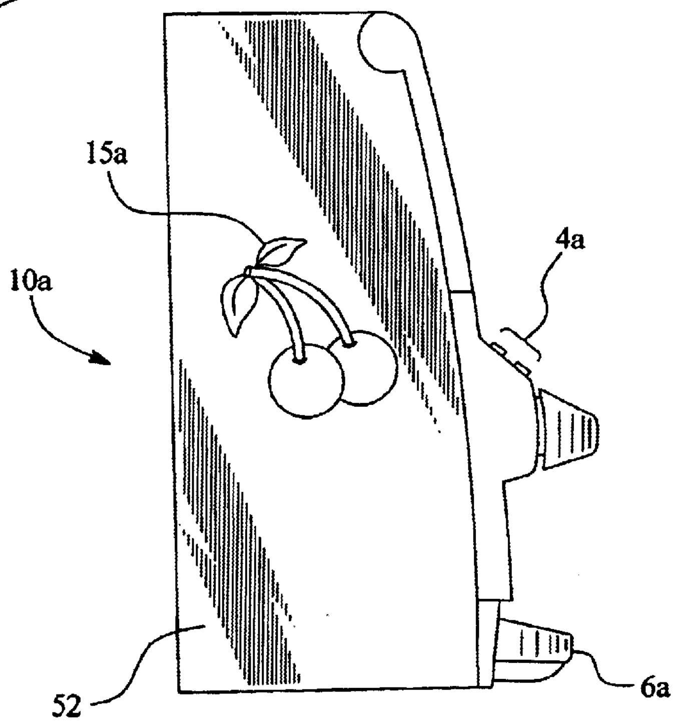
FIG. 2 is a side elevational view of the gaming device of FIG. 1, illustrating the laminate panel on one side of the gaming device.

The present invention is adapted to facilitate the manufacture, modification and repair of gaming devices of different sizes. Referring now to the drawings, and particularly to FIGS. 1, 2, 5, 6 and 7, one embodiment of the gaming device 10*a* of the present invention includes a display or first cabinet or housing 12 which is adapted to receive a display 14 (shown in FIG. 1 with a display and in FIG. 5 without a display) and a component or second cabinet or housing 16 adapted to receive all of the other components of the gaming device. Such components include the gaming device electronic components or controls (such as the CPU, RAM, ROM, power supply and sound card), player interfaces 2 (such as a coin slot, a bill acceptor, a reader or validator for credit cards or debit cards, a player card reader), player input devices 4 (such as a keypad, a play button, a bet display, a bet one button a cashout button), a coin hopper or payout tray 6, a ticket printer (thermal or impact), smart card read/write dispenser, vacuum fluorescent display and speakers. All of the components of the gaming device 10*a* except the display 14 are mounted in or connected to the component cabinet 16 to facilitate independent manufacture of the component cabinet 16 (without dependence on the game theme or scheme). This enhances the overall manufacturing process for gaming devices.

The display is preferabaly adapted to display the primary or base game as well as any secondary or bonus games to the player. The display may be any monitor (with or without a touch screen), cathode ray tube ("CRTs"), high resolution flat panel LCDs, projection type LCDs, plasma displays, field emission displays, digital micromirror displays, LCD touchscreens, flat TV displays or other suitable display device. The display is adapted to display images, symbols, video, and graphics associated with the game to the player as well as system menus and diagnostics to technicians and machine operators or attendants.

Side panels 52 and 54 are respectively adapted to be attached to each side of the display and component cabinets. Although not shown, a back panel may also be attached to the back of the display and component cabinets. As described below, each side panel is decorated in accordance with the theme of the gaming device. The side panels are preferably laminated and are manufactured and attached to the cabinets after the gaming device theme or scheme is finalized. This construction for a gaming device, wherein all of the components of the device are in the component cabinet 16, the monitor 14 is in the display cabinet 12 and the laminate panels 52 and 54 are attached to both sides of the cabinet facilitate ease of manufacture of the gaming device and also facilitates modification and replacement and repair of the gaming device 10. The present invention therefore increases efficiency and the rate of production of gaming devices and facilitates manufacturing line balancing.

Figure 3:
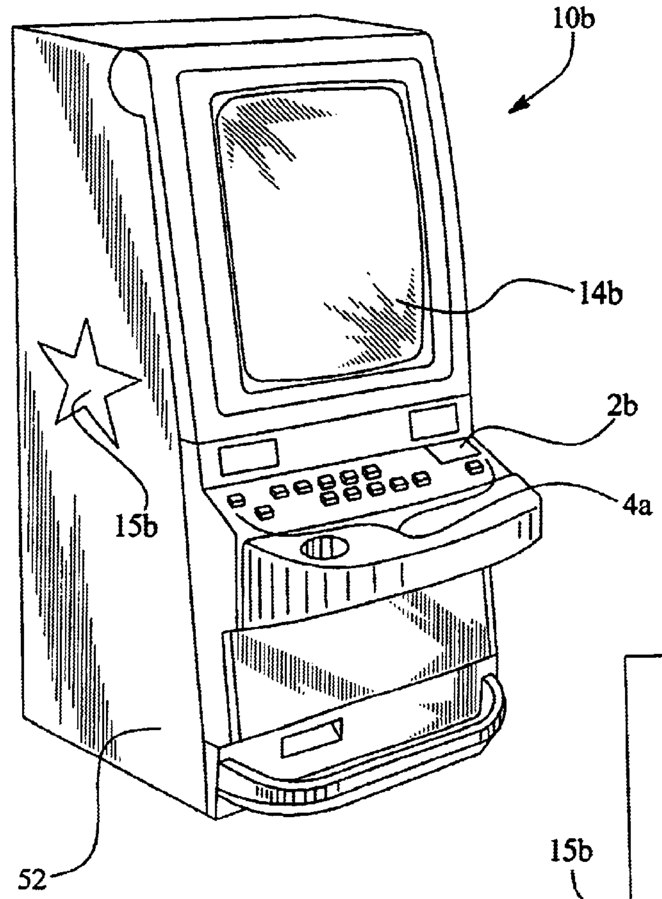
FIG. 3 is a perspective view of a gaming device of the present invention having a larger display cabinet and larger laminate side panels.
Figure 4:
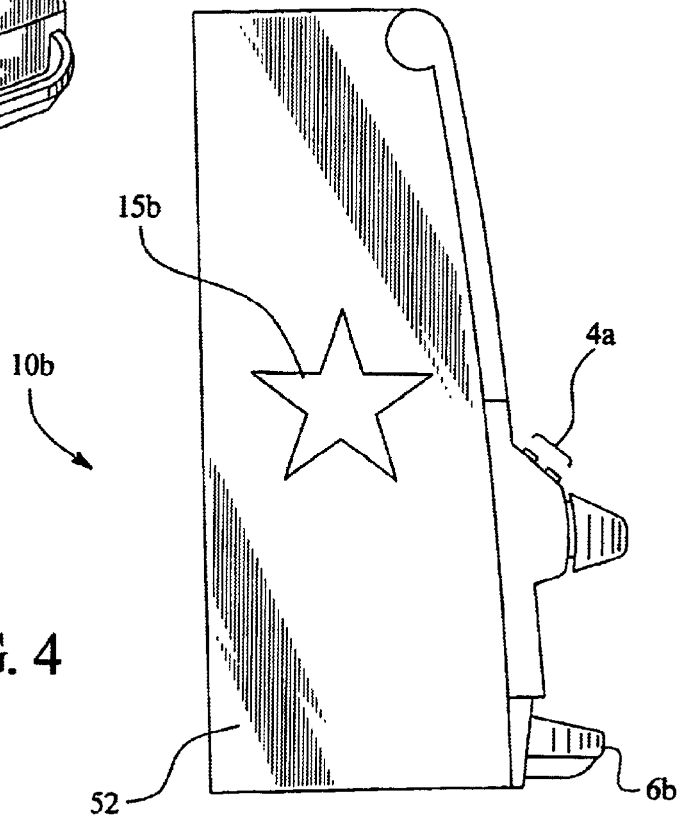
FIG. 4 is a side elevational view of the gaming device of FIG. 3 illustrating the larger laminate panels.
Figure 5:
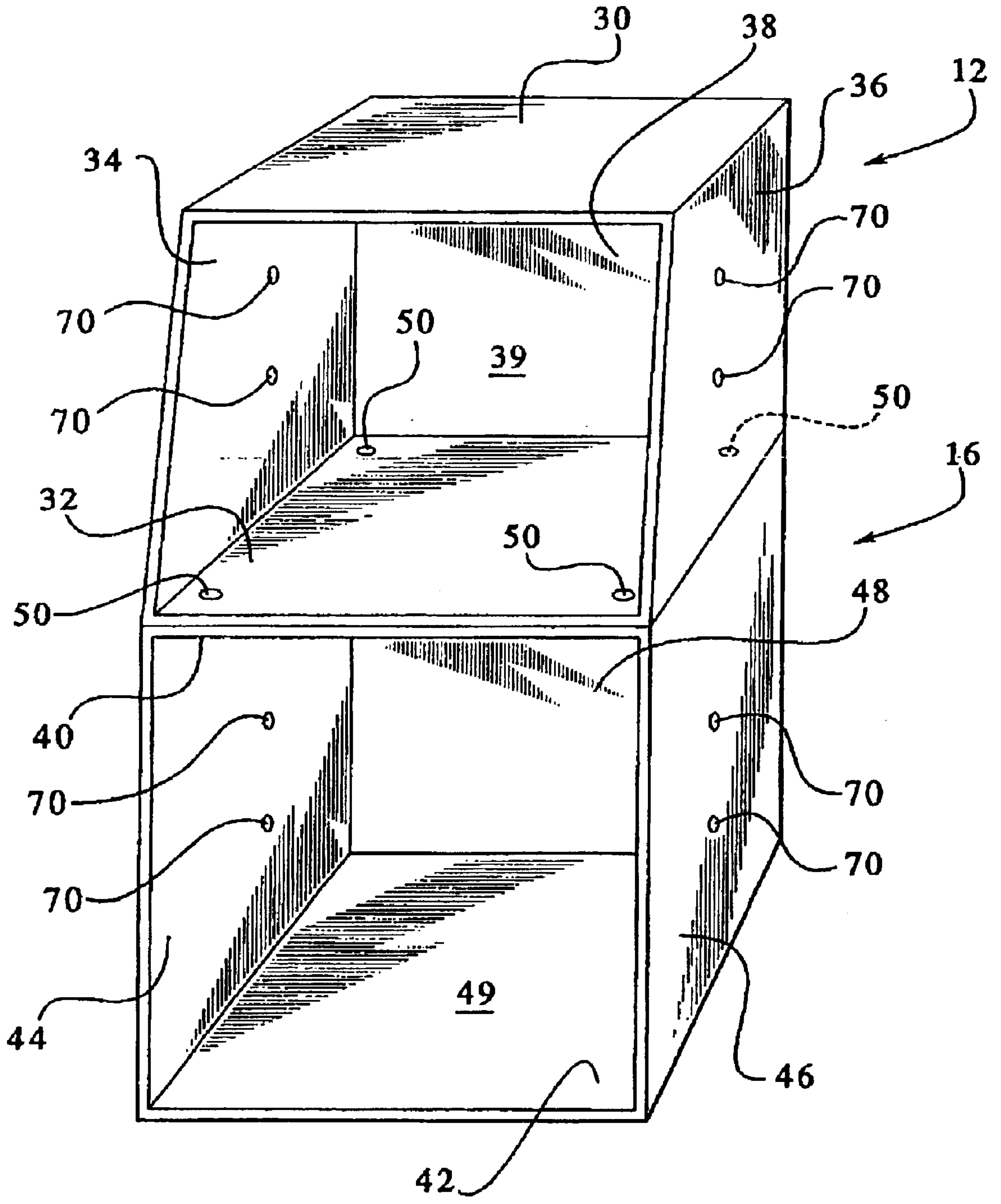
FIG. 5 is a perspective view of the display and component cabinets of one embodiment of the present invention.

For instance, if it is desired to have a larger sized monitor in the gaming device, the monitor could be replaced and positioned in the display cabinet if there is sufficient room in the display cabinet for the monitor. Different support mechanisms may be used for different sized monitors in the display cabinet. On the other hand, if a larger sized monitor, such as a 27 inch monitor, is desired to be placed with the gaming device, a larger display cabinet may be used. The display cabinet will be suitably attached to the component cabinet and the suitably sized laminate panels will be attached to both sides of the system and display cabinets. As further illustrated in FIGS. 3 and 4, a larger sized monitor 14B may thus be used with the same component cabinet. Thus, even in a gaming area, such as a casino, the construction of the gaming device may easily be changed by removing the laminate panels, removing the display from the display cabinet, changing the display cabinet, inserting a new display into the display cabinet, and replacing the laminate panels with larger laminate panels adapted to engage the larger display cabinet. The only electrical connections are between the system component and the new monitor and any subsidiary equipment and connections going through the display area to the optional top box display or external signage. All of the other components remain unchanged in the component cabinet. As illustrated in FIGS. 1, 2, 3 and 4, the indicia 15*a* on the panel 52 (FIGS. 1 and 2) is different than the indicia 15*b* on panel 52 (FIGS. 3 and 4).

As discussed below, it should also be appreciated that the laminate panels could be formed in two or more sections, as illustrated in FIGS. 3 and 4, whereby the lower laminate panel remains connected to the component cabinet and a new laminate panel is attached to the new display cabinet. It should therefore be appreciated that a more systematic construction of gaming devices can be accomplished using the present invention, whereby the component cabinets and the display cabinets are constructed individually and assembled as needed, based on the requirements of each gaming device. Additionally, the laminate panels can be decorated or formed with any suitable indicia to correspond to the theme of the gaming device. Therefore, the manufacturing, modification and repair of gaming devices is substantially improved utilizing the present invention.

In the illustrated embodiment, the display housing 12 includes spaced-apart top and bottom walls 30 and 32, respectively, connected to spaced-apart side walls 34 and 36, respectively, all of which in turn are connected to back wall 38. The top, bottom, side and back walls 30, 32, 34, 36 and 38 define chamber 39. Further, in the illustrated embodiment, the component housing 16, includes spaced apart top and bottom walls 40 and 42, respectively, connected to spaced apart side walls 44 and 46, respectively, all of which are, in turn, connected to back wall 48. The top, bottom, side and back walls 40, 42, 44, 46 and 48, define chamber 49 in the component cabinet or housing 16. Each of the cabinets or housings 12 and 16 is preferably made of rolled steel, although other suitable materials may be used to form the cabinets.

It should be appreciated that the first and second housings 12 and 16 are removably connected together using any suitable fastening device, such as screws, bolts, pegs, hooks, or other suitable locking mechanisms. In one preferred embodiment, the housings 12 and 16 are removably connected together using a plurality of two piece mounting bolts (not shown) such as a sex bolt. The female portion of the bolt contains a hollow cylindrical shaft with threading on an interior surface adapted to receive the threading defined on the exterior of a solid cylindrical shaft of the male portion. In the illustrated embodiment, the first and second housings 12 and 16 define one or more apertures 50 adapted to receive the male and female bolts (not shown).

In the illustrated embodiment, the display housing 12 is adapted to receive a display 14 and has a generally square shape when viewed from the front or the side. It should be appreciated that housing 12 could have any suitable shape depending on the theme and scheme of the gaming device and the size and shape of the display. A plurality of different sized housings are contemplated for use with a plurality of different sized displays. For example, one embodiment of the display housing 12 for gaming device 10*a* could be used with a 18 inch monitor (best viewed in FIG. 1), a second embodiment of the housing 12 for gaming device 10*b* could be used with a 27 inch monitor 14*b* (best viewed in FIG. 3). Gaming devices 10*a* and 10*b* and displays 14*a* and 14*b* are generally collectively referred to herein as gaming device 10 and display 14, respectively.

An alternative embodiment of display housing 12 is contemplated for use with the gaming device 10 of the present invention. In this embodiment, only one display housing is connected to the component housing, wherein the display housing 12 is suitably sized to accommodate the largest display used with the gaming device 10 (in this discussion the 27 inch monitor although larger monitors are contemplated). In this embodiment, the first housing could include any suitable adjustable support or shelving unit (not shown) adapted to be used with different sized monitors. Here, the adjustable support or shelving, in conjunction with the mask discussed in detail below, would be adjusted to accommodate the different sized monitor.

It is anticipated that the housings 12 and 16 define a plurality of openings therein, such as a vent aperture and at least one lock aperture. It should also be appreciated that the component housing 16 preferably includes a door pivotally connected thereto (not shown) to enable the operator to access the gaming device components.

Figure 6:
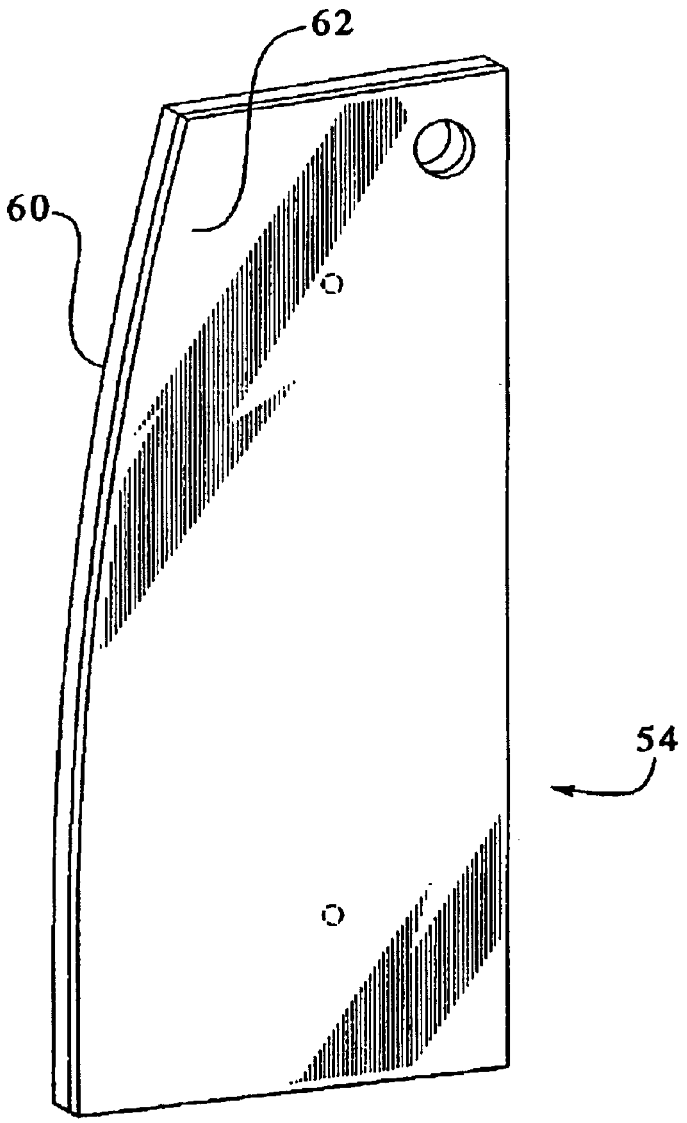
FIG. 6 is a perspective view of a laminate panel of one embodiment of the present invention.
Figure 7:
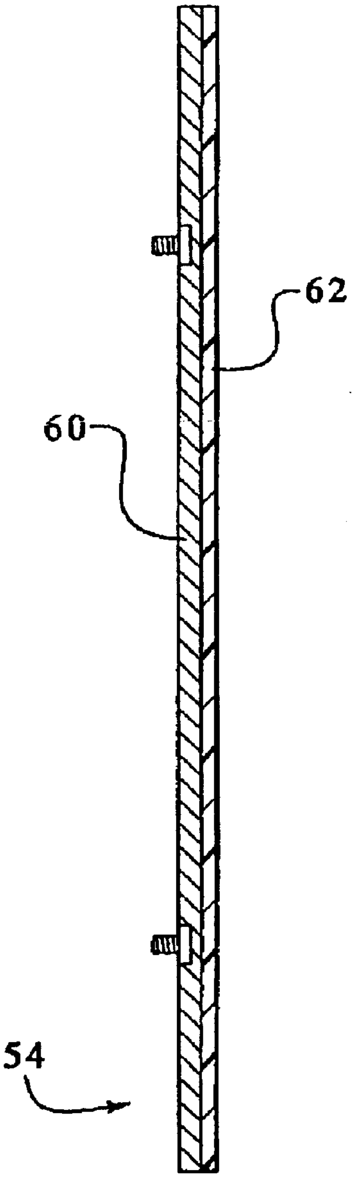
FIG. 7 is a cross-sectional view of the laminate panel of FIG. 6.
Figure 8:
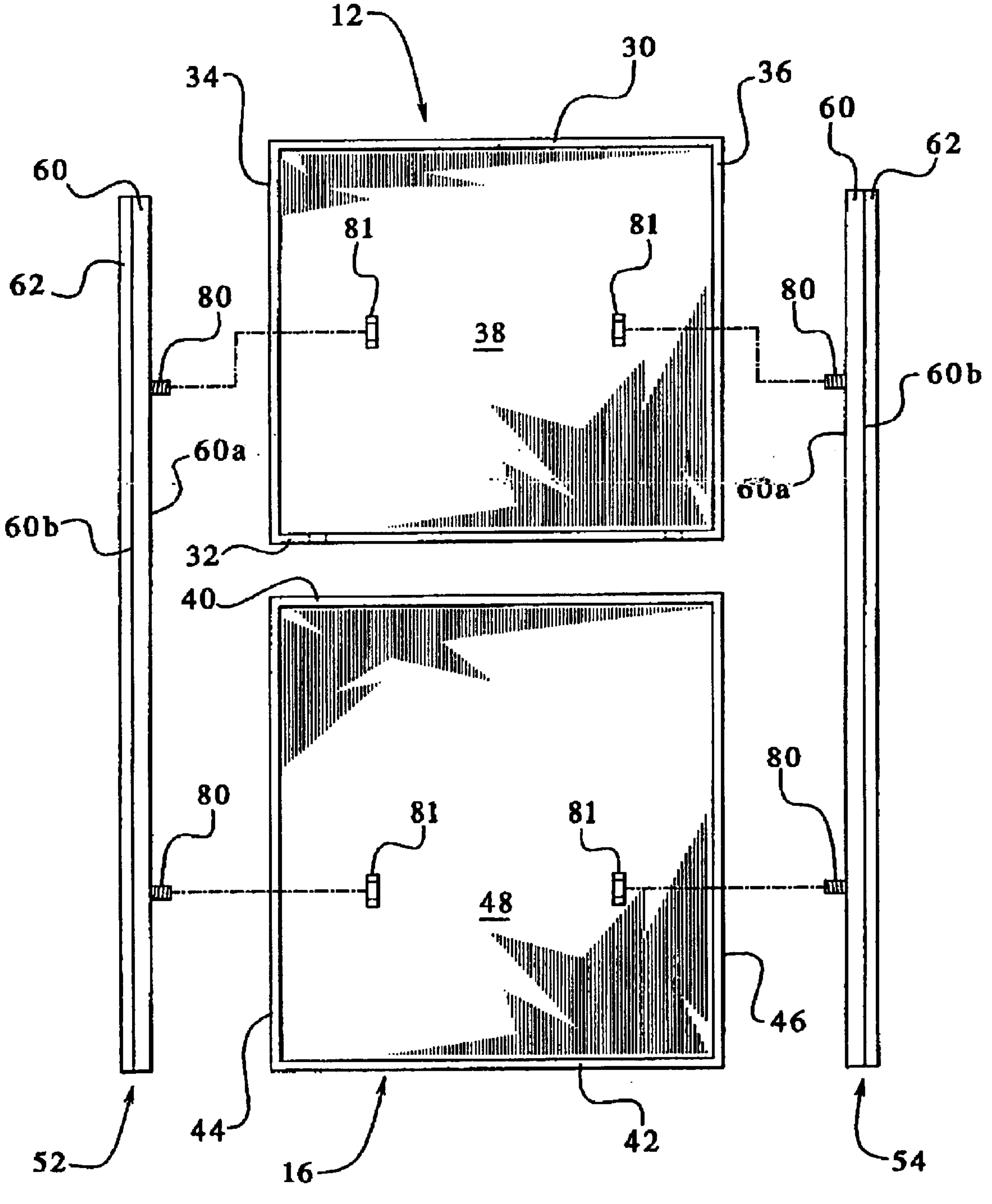
FIG. 8 is an exploded front view of the display cabinet, component cabinet and laminate panels of one embodiment of the present invention.

Turning now to FIGS. 6, 7 and 8, the gaming device includes two laminate panels 52 and 54 which are removably connected to opposite sides of the display cabinet and the component cabinet, using any suitable fastening mechanism, as discussed below. As mentioned above, the gaming device could also include a laminate panel (not shown) connected to the back of the gaming device. Each laminate panel includes a substrate 60 and a decorative layer such as a laminate material 62 on the outer surface of the substrate 60. Preferably, the substrate 60 is formed from extruded aluminum or aluminum alloy, although other materials or methods are contemplated. In the illustrated embodiment, the front edge of the laminate has a slightly rounded appearance moving from the bottom edge to the top edge. It should be appreciated that other shapes and sizes are contemplated. It should also be appreciated that the laminate panels will look similar to traditional installation (laminate on wood or direct installation on cabinet substrate) and not have the appearance of a bolt on panel to the patron.

More specifically, each substrate 60 is formed with two opposing surfaces, a first (inner) and second (outer) surface 60*a* and 60*b*, respectively. The first surface 60*a* is generally flat and removably connects to the outside surface of the cabinets 12 and 16 of the gaming device 10 and specifically to the outside surfaces of the side walls 34, 44, 36 and 46, respectively. The second surface 60*b* is preferably flat or planar and is adapted to receive a decorative layer which is preferably a laminate or laminate material 62 thereon.

The decorative layer or laminate material 62 includes the colors, figures, characters and indicia representing the gaming theme and scheme. In the preferred embodiment, the laminate layer 62 is a colored, pressure sensitive laminate comprised of vinyl, vinyl and metal composite, polyvinyl chloride, or some other mixture. While it is preferred that the laminate is a pressure sensitive material, it is contemplated that a separate adhesive (not shown) may be applied to the second or outer surface 60*b* and the laminate layer 62 applied or connected thereto. It is further contemplated that the laminate may be applied to the substrate 60 in a powdered form. To change the look of the gaming device, the laminate panels may be easily removed and replaced.

In one embodiment, cabinets 12 and 16 define a plurality of openings 70 adapted to receive bolts secured to the substrate. More specifically, in one embodiment, the head of a bolt portion is welded to the aluminum substrate 60 such that the cylindrical shaft 80 of the bolt extends transversely from the substrate towards the cabinets. Preferably, a plurality of bolts 80 are used to removably attach each laminate panel to the cabinets 12 and 16. It should be appreciated that the laminate panels could be adapted to be attached to the cabinets in other suitable manners in accordance with the present invention. For instance, the laminate panels may be snapped into place or may include trim members which hold the laminate panels in place.

In an alternative embodiment of the present invention, the laminate panels are each formed in two or more pieces. Preferably, a suitable trim piece (not shown) is used to form a smooth transition between the panels. The different portions of the laminate panel may be adapted to accommodate different laminate layers portraying the same or different colors, figures, characters or indicia.

Figure 9:
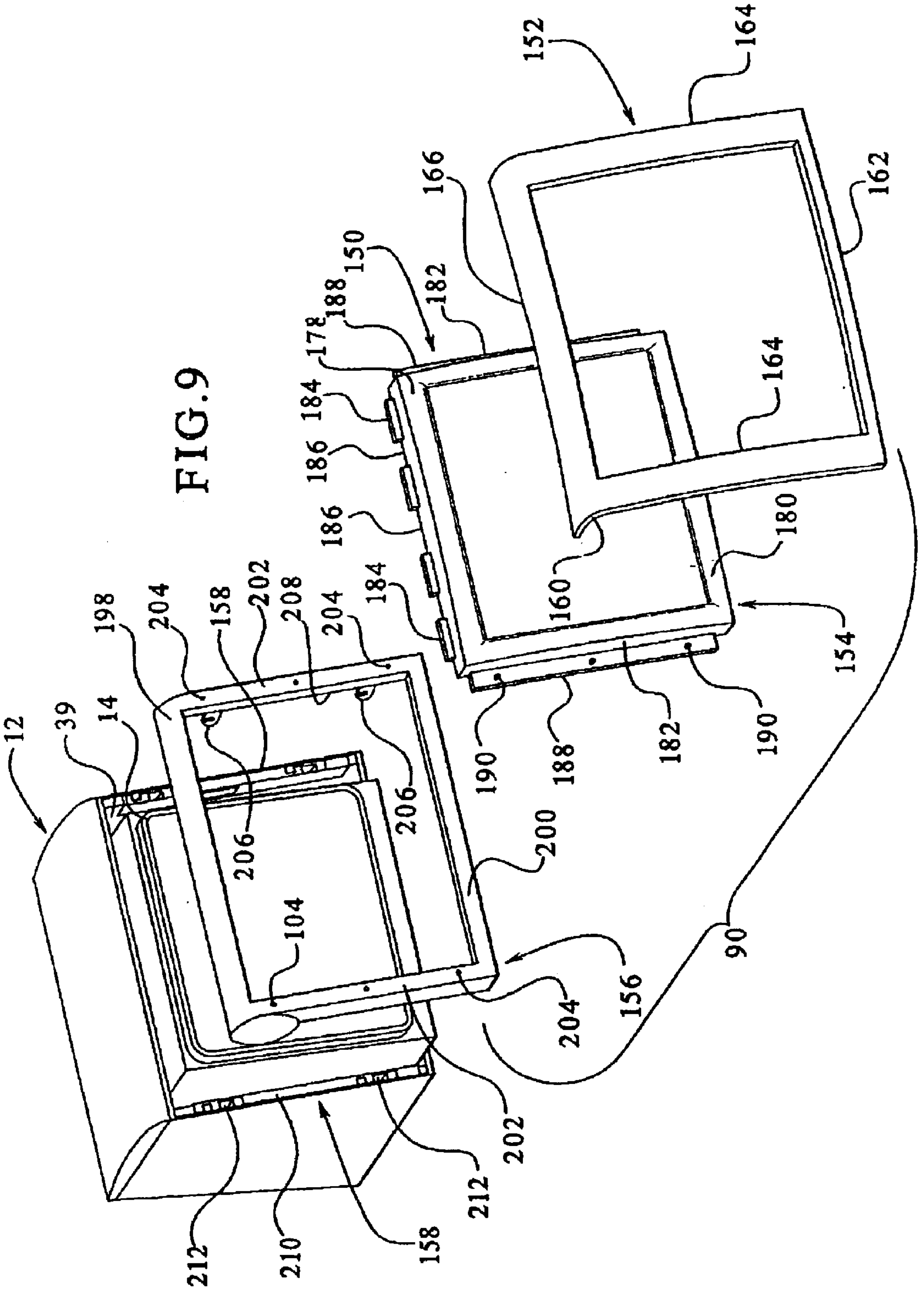
FIG. 9 is an exploded front perspective view of a display cabinet, a substrate, an inner mask and an outer mask which are attached to the display cabinet of one embodiment of the present invention.
Figure 10:
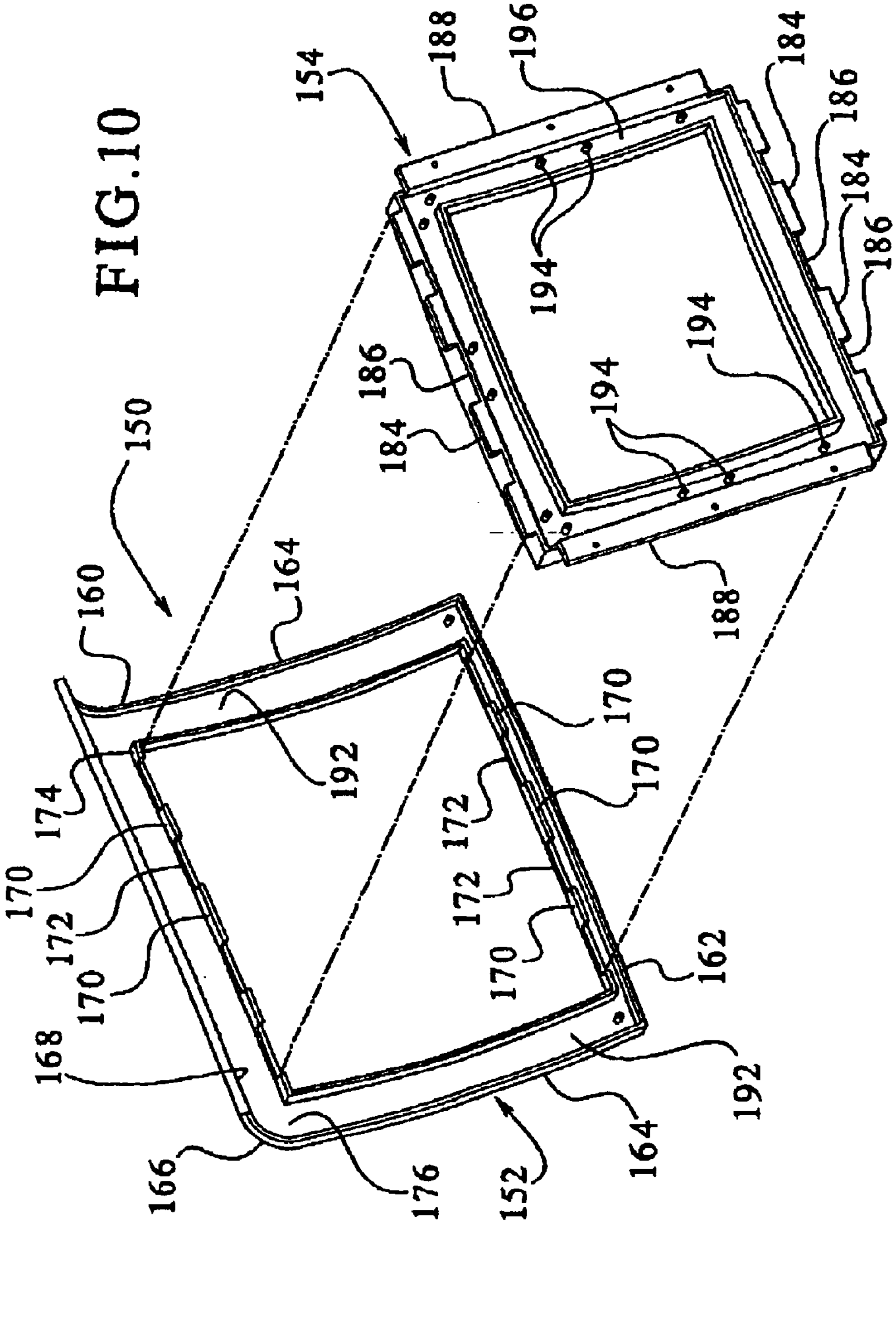
FIG. 10 is an exploded rear perspective view of the inner and outer masks of FIG. 9.
Figure 11:
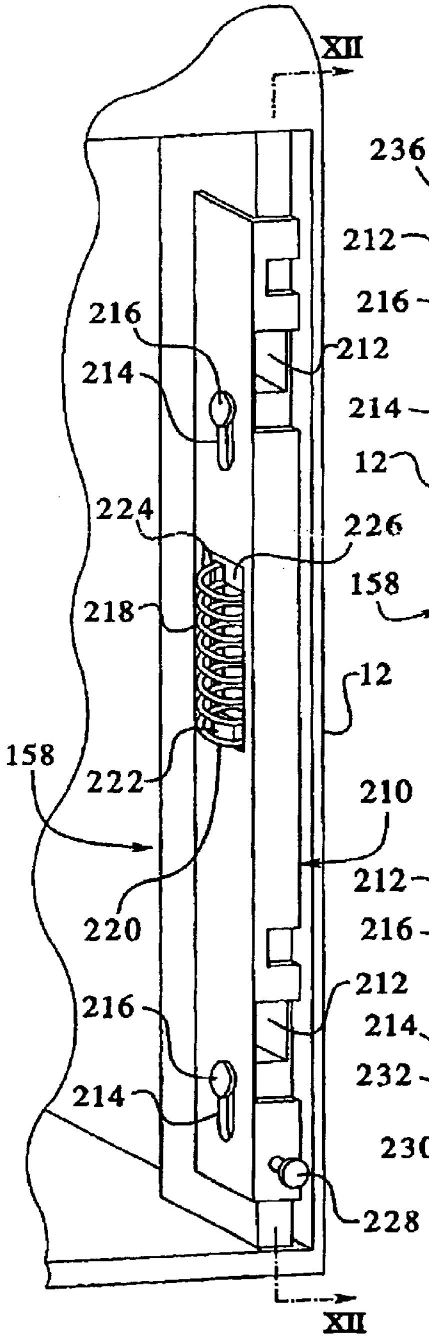
FIG. 11 is an enlarged sectional view of one embodiment of a locking bar of a locking mechanism for connecting the substrate and masks to the display cabinet.
Figure 12:
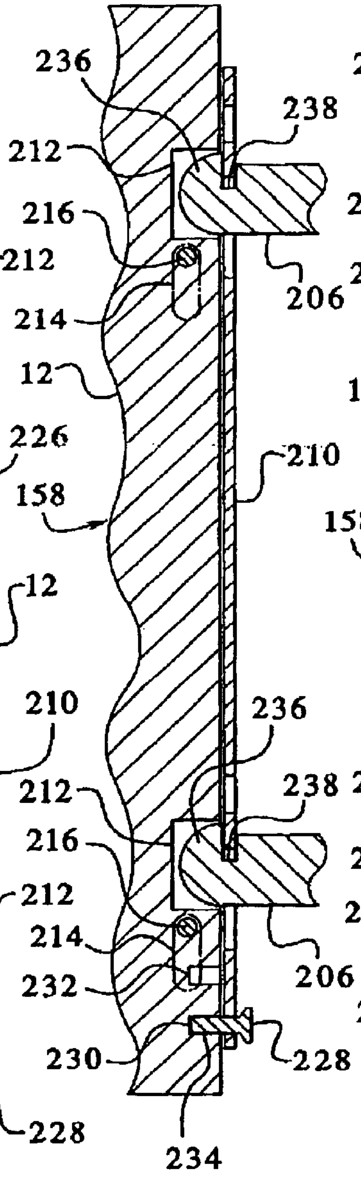
FIG. 12 is a cross-sectional view of the locking mechanism in a locked or engaged position taken substantially along line XII-XII of FIG. 11.
Figure 13:
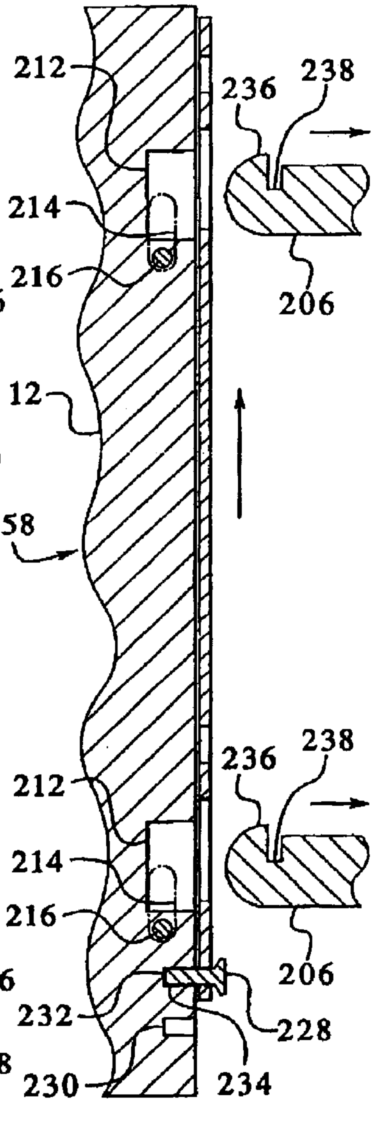
FIG. 13 is a cross-sectional view of the locking mechanism of FIG. 11 in an unlocked or disengaged position.

The use of the laminate panels enables the present to provide a modular gaming device that does not look modular. Turning now to FIGS. 9 and 10, the present invention also preferably provides a monitor cover 90 including at least mask apparatus 150 attached to the display cabinet such that the modular gaming device 10 does not look modular. The mask apparatus 150 preferably includes inner and outer masks or mask members 154 and 152, respectively, which are adapted to removably engage a bracket or substrate 156 which is connected to the display cabinet 12 by a locking mechanism 158 adapted to removably engage the substrate 156 as described below.

This configuration provides for the complete removal of the monitor cover 90 (including the substrate 156 and masks 152 and 154) from the display cabinet 12, facilitating the ease of manufacture, modification and repair of the gaming device 10. This configuration also enables old masks to be replaced with a new mask representing new games or effects on the gaming device 10.

The first or outer mask 152 includes a top or first member 160 and a spaced-apart bottom or second member 162. In addition, the outer mask 152 includes spaced-apart side or third members 164 with are joined to and integral with the spaced apart top and bottom members 160 and 162. The outer mask 152 is preferably a single integral unit of a molded translucent plastic material. It should be appreciated that the outer mask 152 can be extruded, cut or manufactured in any conventional manner using plastic or any other suitable material such as acrylic, paperboard, glass, etc. The outer mask 152 is preferably formed as a single piece of clear or translucent material although colored or dyed material is also contemplated. While a single molded piece is preferred, it should be appreciated that the outer mask 152 could be formed from two or more pieces that are combined or otherwise joined to form an integral unit.

The outer mask 152 includes a curved upper edge 166 integral with and extending along the top or first member as illustrated in FIG. 8. A lip 168 connects to and extends transversely from the upper edge 166. Lip 168 is adapted to removably engage or connect to the display cabinet 12 (or a substrate 156 removably connected to the display cabinet 12).

Top and bottom members 160 and 162 of outer mask 152 include a locking mechanism for removably engaging or connecting to the inner mask 154. In one preferred embodiment, the locking mechanism includes a plurality of alternately spaced tabs 170 and notches 172. In the illustrated embodiment, a lip 174 extends transversely from outer mask 152, specifically from an inner surface 176 thereof, where tabs 170 and notches 172 are defined in an upper and lower portion thereof.

The inner mask 154 comprises spaced-apart top, bottom and side members 178, 180 and 182, respectively, similar to the outer mask 152 discussed previously. Like the outer mask 152, the inner mask 154 is preferably a single integral unit of a molded translucent plastic material although other manufacturing methods and materials are contemplated. Inner mask 154 is preferably formed as a single piece of clear or translucent material although colored or dyed material, or two or more pieces are also contemplated.

The inner mask 154 also includes a locking mechanism for removably connecting to the outer mask 152. In one preferred embodiment, inner mask 154 includes tabs 184 and notches 186 that are spaced in accordance with and co-act with the tabs 170 and notches 172 of the outer mask 152. Preferably, the tabs 184 and notches 186 of the inner mask 154 engage and connect to the corresponding notches 172 and tabs 170 of the outer mask 152 in a removable manner. In the illustrated embodiment, the tabs 184 extend laterally from the outer edges of the top and bottom members. It should be appreciated that the co-acting of the various tabs and notches properly align or position the two masks 152 and 154 with respect to each other, the display 14 and housing 12.

In the preferred embodiment, inner mask 154 includes two wings or members 188 extending from the spaced apart side members 182. A plurality of extending spacers 190 are joined to and integral with the wings or members 188. The spacers 190 contact or engage the inner surface 192 of the outer mask 152 ensuring that the inner and outer masks 154 and 152 are properly spaced apart. In one embodiment, this spacing is used to accommodate one or more illumination devices or sources (not shown).

The inner mask 154 also includes a plurality of lugs 194 integral to and spaced about an inner surface thereof, preferably along the inner surface 196 of the side members 182. The lugs 194 are adapted to secure the inner mask 154 to the substrate 156 as discussed below.

The masks 152 and 154 are preferably different colors and may be back lit by one or more suitable illumination devices or sources (not shown) to provide a lighting effect around the display 14. The masks can be independently illuminated, simultaneously illuminated and illuminated many desired combination or sequence. It should also be appreciated that the present invention contemplates the use of more than two monitor masks suitably connected to the substrate 156.

Gaming device 10 preferably includes a substrate or frame 156 that securely engages or connects to the housing 12 of the cabinet 60. Like the inner and outer masks 154 and 152 discussed previously, the frame or substrate 156 comprises spaced apart top, bottom and side members 198, 200 and 202 respectively as illustrated in FIG. 7. Frame or substrate 156 is preferably formed from cold-rolled steel. It should be appreciated that the substrate 156 can be extruded, cut or otherwise manufactured in any conventional manner using other suitable metal materials, plastic or any other suitable material. The frame or substrate 156 preferably has a suitable decorative coating such as plating.

In one preferred embodiment, the present invention further includes one or more locking mechanisms for removably securing the inner and outer masks 154 and 152 to the display cabinet 12. The inner mask 154 includes a plurality of lugs 194 projecting from the inner surface 196 as described previously. The frame or substrate 156 defines a plurality of indentations or hollows 204 in the spaced apart side members 202 that are spaced in accordance with and co-act with the lugs 194 of the inner mask 154. While the lugs 194 and indentations 204 are preferred, other means for removably connecting the inner mask 154 and frame or substrate 156 are contemplated, including screws, hooks, double-sided tape, etc.

A locking mechanism 158 is used to removably secure the frame or substrate 156 to the display cabinet 12 as illustrated in FIGS. 9 through 13. While preferably the locking mechanism 158 is connected to display cabinet 12, it should be appreciated that the locking mechanism could be connected to display cabinet 12 in an alternative manner. In one preferred embodiment, frame or substrate 156 includes at least one but generally two or more hooks 206 extending from inner edge 208 of the side members 202. In the illustrated embodiment, four hooks 206 extend generally transversely from the inner edge 208 of the side members 202. It should be appreciated that the hooks 206 are formed as part of and integral with the frame or substrate 156 during the molding process. However it is also contemplated that the hooks 206 are formed as a separate integral unit of the same or different material as the frame or substrate 156 and connected thereto.

In the preferred embodiment, the locking mechanism 158 includes at least one elongated portion and locking member joined to the housing 12 as illustrated. The locking mechanism 158 is adapted to removably connect the frame or substrate 156 to the display cabinet 12. In one preferred embodiment, the locking mechanism includes two elongated portions or slidable locking bars 210 located on either side of the display aperture or chamber 39 of the cabinet 12, placed parallel to the sides of the gaming device (best viewed in FIG. 7). Each slideable locking bar 210 defines at least one, but preferably two, engaging slots 212 spaced in accordance with and co-acting with the hooks 206. Additionally, each slidable locking bar 210 defines at least one but preferably two slots 214 that slideably secure the locking bar 210 to pegs or screws 216 extending from the cabinet 60, preferably from housing 62.

Each locking bar 210 includes a biasing device that biases the locking bars 210 in a locked position to prevent unwanted removal of the substrate 156. In the illustrated embodiment, the locking bar 210 includes a spring 218 having a first end 220 connected to a peg 222 on the locking bar 210. A second end 224 of the spring 218 is connected to a peg 226 on the display cabinet 12 and adapted to bias the locking bar 210 towards the closed position. While a spring 218 and pegs 222 and 226 are preferred, it should be appreciated that any biasing device (i.e., a spring bar) is contemplated.

The locking mechanism 158 further includes a locking member that locks the locking bar 210 in the closed or locked position. In the illustrated embodiment, the locking mechanism includes a plunger 228 extending generally transversely from each of the locking bars 210. The cabinet 12 defines at least one, but preferably two seats or sockets (referred to as first and second seats 230 and 232, respectively) that co-act with an engaging end 234 of the plungers 228. Preferably, each plunger 228 includes a spring (not shown) that biases the plunger 228 inwardly towards the seats 230 and 232 in a manner well known in the art.

In the closed position, the hooks 206 of frame or substrate 156 sit in the engaging slots 212 and are engaged by the locking bar 210, so that at least a portion of the hooks 206 (i.e., at least the tip 236 and slot 238) engages, catches or hooks the locking bar 210. Moving the plunger 228 outwardly from the first seat 230 enables the locking bar 210 to slideably move towards the unlocked position, so that the sliding bar 210 no longer engages the hooks 206. The hooks 206 now sit freely in the engaging slots 212 and can be easily removed by pulling outwards on the frame or substrate 156.

It should be appreciated that assembling the gaming device 10 using modular cabinet is a relatively straight forward and efficient process. The first and second housings 12 and 16 are connected together using a removable connecting device. The electric components are assembled and positioned in housing 16, while the display 14 is positioned in housing 12. The locking mechanism 158 is connected to the cabinet, preferably to housing 12, prior to placing the display 14 therein and connecting it to the appropriate electrical component.

Generally, to construct a gaming device in accordance with the present invention, the decorative or laminate layer. 62 is prepared and applied or connected to the substrate 60 of the laminate panels 52 and 54. The laminate panels 52 and 54 are connected to the housings 12 and using a removable connecting mechanism. Masks 152 and 154, and frame 156 are assembled and removably connected to the display cabinet 12, and preferably to locking mechanism 158 in display cabinet 12. A door is pivotally connected to the component cabinet 16.

It should be further appreciated that changing the gaming theme and scheme is likewise a relatively straightforward and efficient process. For example, a technician opens the door reaches under the frame 156 and pulls up on the plungers 228. Pulling up on the plungers 228 (i.e., away from the locking bar 210), disengages the plunger engaging ends 234 from the first socket 230. As the locking bar 210 is moved to the open position in the illustrated embodiment, the locking bar 210 slideably moves along the pegs or screws 216 until the plunger engaging end 234 engages the second seat 232. The locking bar 210 no longer engages the hooks 206, which may now be removed from engaging slot 212. The masks and frame may be removed from the cabinet 12, and display 14 may now be removed from chamber 39.

The technician unlocks and opens the door pivotally connected to cabinet 16. The technician may now unfasten nuts 81 from the bolts 80 connecting the panels 52 and 54 to the cabinets 12 and 16, to remove the panels 52 and 54. The technician may access the components to update the gaming scheme (i.e., replace a chip, insert new code, etc.). If necessary, a new, differently sized display housing may be placed on housing 16 and removably connected thereto using bolts. The newly sized display is placed in chamber 39 of the new display housing and connected to the electrical components contained in component housing 16. It should be appreciated that if the same sized monitor is to be used, the display housing 12 need not be replaced. New laminate panels are positioned so that the shafts 80 are received in the apertures 70 of the cabinets. The new laminate panels are then securely connected to cabinets 12 and 16.

If necessary, new masks 152 and 154 and a frame 156 is replaced so that the hooks 206 engage the engaging slots 212. The plungers 228 are again pulled up so that the plunger engaging ends 234 disengage the second seat 232. The sliding bar 210 is moved back manually (or biased by the spring) to the locked position so that the locking bar 210 engages the hooks 206 and the plunger engaging ends 234 engage the first seats 230. The door is the closed.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

What is claimed is:

1. A gaming device comprising:

a component cabinet including a first side wall, an opposing second side wall and a first rear wall connected to said first and second side walls;

a display cabinet removably connected to said component cabinet, said display cabinet including a third side wall, an opposing fourth side wall and a second rear wall connected to said third and fourth side walls;

a display device mounted in said display cabinet and operable with a processor and at least one player input device to enable a player to play a game upon a wager by the player;

at least two side panels, a first side panel removably connected to said first side wall and said third side wall and a second side panel removably connected to said second side wall and said fourth side wall; and securing means for securing said first side panel to said first side wall and said third side wall from inside of said component cabinet and said display cabinet respectively and for securing said second side panel to said second side wall and said fourth side wall from inside of said component cabinet and said display cabinet respectively, wherein said securing means can only be unsecured from said side panels and said side walls from inside of said component cabinet and said display cabinet, and wherein each side panel includes a substrate and a decorative layer connected to the substrate; and a lockable door movably connected to said component cabinet which is movable to access the inside of said component cabinet and said display cabinet.

2. The gaming device of claim 1, wherein the substrate is a relatively thin strong material.

3. The gaming device of claim 2, wherein the substrate is metal.

4. The gaming device of claim 3, wherein the substrate is aluminum.

5. The gaming device of claim 1, wherein the decorative layer includes laminate applied to an outside surface of the substrate.

6. The gaming device of claim 5, wherein the laminate is in a spray form.

7. The gaming device of claim 5, wherein the laminate is in a sheet form.

8. The gaming device of claim 5, wherein the laminate is applied as a continuous sheet.

9. The gaming device of claim 5, wherein the laminate is applied as a plurality of sheets.

10. The gaming device of claim 1, which includes an adhesive connecting the decorative layer to the substrate.

11. The gaming device of claim 1, which includes:

a substrate removably connected to the display cabinet;

a first mask connected to an exterior side of said substrate and surrounding said display device; and a second mask connected to an exterior side of the first mask and surrounding the display device.

12. The gaming device of claim 11, wherein the first mask is removably connected to the substrate and the second mask is removably connected to the first mask.

13. The gaming device of claim 11, wherein the second mask is removably connected to the first mask.

14. The gaming device of claim 11, which includes a locking mechanism which removably connects the substrate to said display cabinet.

15. The gaming device of claim 11, wherein the first mask is removably connected to the substrate.

16. The gaming device of claim 11, wherein the second mask includes a rounded edge adapted to removably engage said display cabinet.

17. The gaming device of claim 11, which includes at least one illumination device connected to said display cabinet and adapted to illuminate at least one of the first and second masks.

18. A gaming device comprising:

a component cabinet including a first side wall, an opposing second side wall and a first rear wall connected to said first and second side walls;

a plurality of differently sized display cabinets adapted to be removably connected to said component cabinet and adapted to be used with a plurality of differently sized display devices, each of said display cabinets including a third side wall, an opposing fourth side wall and a second rear wall connected to said third and fourth side walls, wherein at least one of the display devices is operable with a processor and at least one player input device to enable a player to play at least one game upon a wager by the player;

a plurality of side panels, at least one first side panel removably connected to said first side wall and said third side wall of said component cabinet and at least one of said display cabinets and at least one second side panel removably connected to said second side wall and said fourth side wall of said component cabinet and said at least one display cabinet; and securing means for securing said first side panel to said first side wall and said third side wall from inside of said component cabinet and said at least one display cabinet respectively and for securing said second side panel to said second side wall and said fourth side wall from inside of said component cabinet and said at least one display cabinet respectively, wherein said securing members can only be unsecured from said side panels and said side walls from inside of said component cabinet and said at least one display cabinet;

wherein each side panel includes a substrate and a decorative layer connected to the substrate; and a lockable door movably connected to said component cabinet which is movable to access the inside of said component cabinet and said at least one display cabinet.

19. The gaming device of claim 18, wherein the component and display cabinets are made of rolled steel.

20. The gaming device of claim 18, wherein a plurality of components of the gaming device except the at least one of the display devices are adapted to be connected to or stored in the component cabinet.

21. The gaming device of claim 20, wherein said components include a bill acceptor, a coin acceptor, a keypad, a card reader, a ticket printer and a coin hopper.

22. The gaming device of claim 18, which includes a locking mechanism removably connecting one of the display cabinets to the component cabinet.

23. The gaming device of claim 18, which includes a monitor cover removably connected to the display cabinet.

24. The gaming device of claim 23, wherein the monitor cover includes a frame and at least one mask connect to the frame.

25. The gaming device of claim 23, wherein the monitor cover includes a frame and two masks connected to the frame.

26. The gaming device of claim 18, which includes:

a substrate removably connected to at least one of said display cabinets;

a first mask connected to an exterior side of said substrate and surrounding said display device adapted to be used with said display cabinet; and a second mask connected to an exterior side of the first mask and surrounding the display device.

27. The gaming device of claim 26, wherein the first mask is removably connected to the substrate and the second mask is removably connected to the first mask.

28. The gaming device of claim 26, wherein the second mask is removably connected to the first mask.

29. The gaming device of claim 26, which includes a locking mechanism which removably connects the substrate to said display cabinet.

30. The gaming device of claim 26, wherein the first mask is removably connected to the substrate.

31. The gaming device of claim 26, wherein the second mask includes a rounded edge adapted to removably engage said display cabinet.

32. The gaming device of claim 26, which includes at least one illumination device connected to said display cabinet and adapted to illuminate at least one of the first and second masks.

* * * * *